(12) United States Patent
Koehler et al.

(10) Patent No.: US 11,061,401 B2
(45) Date of Patent: Jul. 13, 2021

(54) STOWABLE STEERING WHEEL FOR AUTONOMOUS VEHICLES

(71) Applicant: Ford Global Technologies, LLC, Dearborn, MI (US)

(72) Inventors: Juergen Koehler, Cologne (DE); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 16/666,873

(22) Filed: Oct. 29, 2019

(65) Prior Publication Data

US 2021/0124349 A1 Apr. 29, 2021

(51) Int. Cl.
| | |
|---|---|
| *G05D 1/00* | (2006.01) |
| *B62D 1/183* | (2006.01) |
| *B62D 1/181* | (2006.01) |
| *B62D 15/02* | (2006.01) |
| *B62D 1/185* | (2006.01) |
| *B62D 5/04* | (2006.01) |

(52) U.S. Cl.
CPC ........... *G05D 1/0061* (2013.01); *B62D 1/181* (2013.01); *B62D 1/183* (2013.01); *B62D 1/185* (2013.01); *B62D 5/0409* (2013.01); *B62D 15/0215* (2013.01)

(58) Field of Classification Search
CPC ...... G05D 1/0061; B62D 1/181; B62D 1/185; B62D 1/183; B62D 15/0215; B62D 5/0409
USPC ............................................................ 701/23
See application file for complete search history.

(56) References Cited

U.S. PATENT DOCUMENTS

| | | | |
|---|---|---|---|
| 1,125,539 A | 1/1915 | Horowitz | |
| 1,268,505 A | 6/1918 | Sincere | |
| 1,416,636 A | 5/1922 | Hanes | |
| 1,459,957 A | 6/1923 | Merritt | |
| 1,722,151 A | 7/1929 | Mantout | |
| 1,847,209 A | 3/1932 | Bolinas, Jr. | |
| 2,155,123 A | 4/1939 | Gerardy | |
| 2,326,131 A | 8/1943 | Eschelbacher | |
| 3,386,309 A | 6/1968 | Reed et al. | |

(Continued)

FOREIGN PATENT DOCUMENTS

| | | | |
|---|---|---|---|
| DE | 10245523 A1 | 4/2004 | |
| DE | 10347925 A1 | 5/2005 | |

(Continued)

*Primary Examiner* — Jonathan M Dager
*Assistant Examiner* — Jean W Charleston
(74) *Attorney, Agent, or Firm* — David L. Coppiellie; Price Heneveld LLP

(57) ABSTRACT

A steering column for autonomous vehicles includes a powered actuator controlling rotation of a lower column, an inner column, and an upper column that is movable relative to the lower and inner columns. Rotation of the lower column relative to the upper column moves the upper column lengthwise. A powered lock rotatably interconnects the inner and lower columns when in a first position, and locks the inner column to a base when in a second position. In an autonomous mode, the upper column is stowed, the powered lock is in the first position, and the motor inhibits rotation of the lower column. In a manual mode, the upper column is extended, the powered lock is in the second position, and a sensor detects an angular position of the upper column.

20 Claims, 8 Drawing Sheets

(56) References Cited

U.S. PATENT DOCUMENTS

| | | | |
|---|---|---|---|
| 4,503,504 A | 3/1985 | Suzumura et al. | |
| 5,178,411 A | 1/1993 | Fevre et al. | |
| 7,191,679 B2 | 3/2007 | Tomaru et al. | |
| 7,441,799 B2 | 10/2008 | Enders | |
| 7,862,084 B2 | 1/2011 | Maeda | |
| 9,073,574 B2 | 7/2015 | Cuddihy et al. | |
| 9,243,434 B2 | 1/2016 | Koarai | |
| 9,333,983 B2 | 5/2016 | Lathrop | |
| 9,845,103 B2 | 12/2017 | Lubischer et al. | |
| 9,919,724 B2 | 3/2018 | Lubischer et al. | |
| 10,343,706 B2 * | 7/2019 | Lubischer | B62D 1/19 |
| 10,351,160 B2 | 7/2019 | Nash et al. | |
| 10,494,010 B2 | 12/2019 | von Freyberg | |
| 10,562,558 B1 | 2/2020 | Spahn | |
| 2004/0016588 A1 | 1/2004 | Vitale | |
| 2007/0241548 A1 * | 10/2007 | Fong | B60R 21/09 |
| | | | 280/777 |
| 2007/0295151 A1 | 12/2007 | Kentor | |
| 2016/0121918 A1 * | 5/2016 | Soderlind | B62D 1/197 |
| | | | 74/493 |
| 2016/0325662 A1 | 11/2016 | Nash | |
| 2016/0375924 A1 | 12/2016 | Bodtker | |
| 2017/0225570 A1 | 8/2017 | El Aile | |
| 2017/0297606 A1 * | 10/2017 | Kim | B62D 1/181 |
| 2018/0079441 A1 * | 3/2018 | McKinzie | B62D 1/183 |
| 2018/0148084 A1 * | 5/2018 | Nash | B62D 1/183 |
| 2018/0154921 A1 * | 6/2018 | Bonello | B62D 1/06 |
| 2018/0154932 A1 * | 6/2018 | Rakouth | B62D 1/286 |
| 2018/0304788 A1 | 10/2018 | Park | |
| 2018/0334183 A1 * | 11/2018 | Beauregard | B62D 1/06 |
| 2019/0111960 A1 * | 4/2019 | Freudenstein | B62D 1/181 |
| 2019/0176868 A1 | 6/2019 | Kreutz | |
| 2019/0185041 A1 | 6/2019 | Shin | |
| 2019/0367072 A1 * | 12/2019 | Hansen | B62D 1/183 |

FOREIGN PATENT DOCUMENTS

| | | |
|---|---|---|
| DE | 102005044289 A1 | 3/2007 |
| DE | 102010055589 A1 | 6/2012 |
| DE | 102017209499 A1 | 12/2018 |
| FR | 2779695 A1 | 12/1999 |
| GB | 2308642 B | 9/1998 |
| GB | 2550640 A | 11/2017 |
| GB | 2550641 A | 11/2017 |
| JP | 1111566 A | 1/1999 |
| JP | 3203949 B2 | 9/2001 |
| JP | 3468742 B2 | 11/2003 |
| JP | 6071477 B2 | 2/2017 |
| WO | 2003020571 A1 | 3/2003 |
| WO | 2017060149 A1 | 4/2017 |
| WO | 2017067721 A1 | 4/2017 |
| WO | 2018073518 A1 | 4/2018 |
| WO | 2018073526 A1 | 4/2018 |
| WO | 2020095020 A1 | 5/2020 |

\* cited by examiner

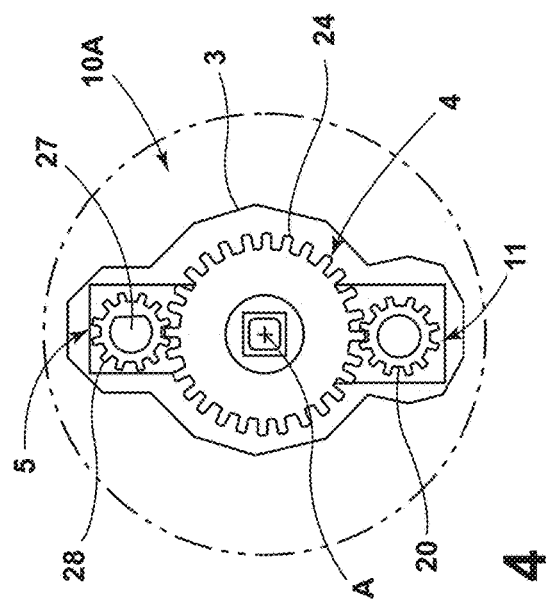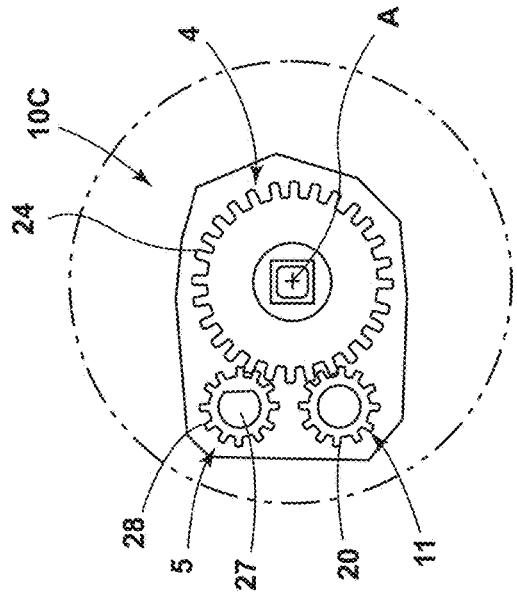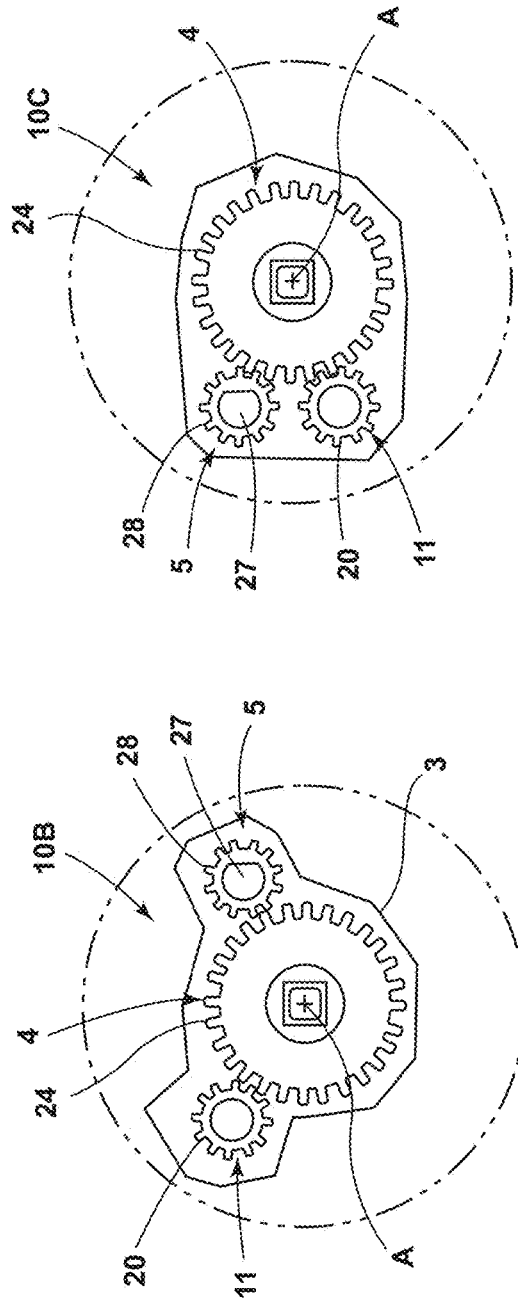

STOWABLE STEERING WHEEL FOR AUTONOMOUS VEHICLES

FIELD OF THE INVENTION

The present invention generally relates to a stowable steering column for motor vehicles, and in particular to a stowable steering column for autonomous vehicles.

BACKGROUND OF THE INVENTION

Various types of stowable steering wheels have been developed. In general, stowable steering wheels move between use and stowed positions. Such steering systems have been proposed for autonomous vehicles.

SUMMARY OF THE INVENTION

One aspect of the present disclosure is a steering column for autonomous motor vehicles. The steering column includes a static member and a rotatable lower (first) column. A motor operably engages the lower column whereby actuation of the motor cause the lower column to rotate. The motor has a locked state in which the motor inhibits or prevents rotation of the lower column. The steering column includes an angular position sensor that is configured to generate a steering command signal corresponding to an angular position of the lower column. The steering column further includes a rotatable inner (second) column, and a rotatable upper (third) column movably (e.g., telescopically) engaging the lower column and the inner column whereby the upper column is movable (e.g., axially) along an axis of the steering column relative to the lower column and relative to the inner column whereby the upper column moves between a retracted position and a use position. The upper column is rotatably fixed relative to the inner column by a spline or other suitable arrangement whereby the upper column and the inner column rotate together about the axis of the steering column. The upper column and the lower column are operably (e.g., threadably) interconnected such that actuation of the motor causes rotation of the lower column relative to the upper column, and causes linear movement of the upper column relative to the lower column between the retracted and use positions. The steering column further includes a steering wheel that is fixed to the upper column. The steering column further includes a powered lock that is configured to lock the inner column to the lower column when the powered lock is in a first position. The powered lock is configured to lock the inner column to the static member when the powered lock is in a second position. The steering column defines: 1) an autonomous configuration in which the upper column and the steering wheel are in the stowed position, the powered lock is in the first position, and the motor is in a locked state to prevent rotation of the lower column, and: 2) a manual steering configuration in which the upper column is in the use position, and the powered lock is in the second position to prevent rotation of the inner column relative to the static member. The sensor is configured to generate a steering command signal corresponding to an angular position of the lower column, the upper column, and the steering wheel when the steering column is in the manual steering configuration.

Embodiments of the first aspect of the disclosure can include any one or a combination of the following features:

The inner column may be rotatably connected to the static member.

The inner column may include a shaft extending through an opening in the lower column.

The lower column may include outwardly-facing gear teeth.

The motor may include a rotating output shaft having a drive gear mounted to the output shaft.

The drive gear may engage the outwardly-facing gear teeth of the lower column whereby the output shaft rotates when the motor is actuated to thereby rotate the lower column.

The angular position sensor may be operably connected to the output shaft of the motor whereby the angular position sensor generates a signal corresponding to an angular position of the output shaft.

The inner column may include outwardly-facing gear teeth.

The powered lock may include a lock member that simultaneously engages the outwardly-facing gear teeth of the lower column and the outwardly-facing gear teeth of the inner column when the powered lock is in the first position to rotatably lock the lower column to the inner column.

The lock member may simultaneously engage the outwardly-facing gear teeth of the inner column and a lock surface of the static member when the powered lock is in the second position to prevent rotation of the inner column relative to the static member.

The powered lock may comprise a linear solenoid that shifts the lock member between the first and second positions when the powered lock is actuated.

The shaft of the inner column may include a first splined portion that axially and slidably engages a corresponding second splined portion of the upper column whereby: 1) the inner column and the upper column are rotatably fixed relative to one another, and: 2) the inner column and the second column telescope axially relative to one another.

Another aspect of the present disclosure is an autonomous vehicle including a control system that is configured to generate steering commands when the autonomous vehicle is in an autonomous operation mode. The control system is configured to utilize steering commands from a vehicle operator when the autonomous vehicle is in a manual operation mode. The autonomous vehicle includes a steering column having a static member and a rotatable first column. The steering column further includes a motor operably connected to the control system, wherein the motor mechanically engages the first column such that actuation of the motor causes the first column to rotate. An angular position sensor is configured to generate a steering command signal to the control system corresponding to an angular position of the first column when the autonomous vehicle is in the manual operation mode. The steering column further includes a rotatable second column, and a rotatable third column. The third column is movably coupled to the first column and the second column whereby the third column is movable along an axis of the steering column relative to the first column and the second column between retracted and use positions. The third column is rotatably fixed relative to the second column whereby the third column and the second column rotate together. The third column and the first column are operably interconnected such that actuation of the motor causes rotation of the first column relative to the third column, and causes axial movement of the third column relative to the first column between the retracted and use positions. The third column includes a manual steering input member such as a steering wheel. The steering column further includes a powered lock that is configured to lock the second column to the first column when the powered lock is in a first position. The powered lock is further configured to lock the second column to the static member when the powered lock is in a second position. The steering column defines: 1) an autonomous configuration in which the third column is in the stowed position, the powered lock is in the first position, and the motor prevents rotation of the first column, and: 2) a manual steering configuration in which the third column is in the use position, and the powered lock is in the second position to prevent rotation of the second column relative to the static member. The sensor is configured to generate a steering command signal corresponding to an angular position of the first column, the third column, and the manual steering input member. The control system is configured to actuate the motor and the powered lock to shift the steering column between the autonomous configuration and the manual steering configuration.

Embodiments of the second aspect of the disclosure can include any one or a combination of the following features:

The first and third columns may be threadably interconnected.

The second column may include a shaft extending through an opening in the first column to rotatably interconnect the second column and the first column.

The first and second columns may include outwardly-facing gear teeth.

The motor may include a rotating output shaft having a drive gear mounted to the output shaft, the drive gear engaging the outwardly-facing gear teeth of the first column whereby actuation of the motor rotates the lower column.

The powered lock may include a lock member that simultaneously engages the outwardly-facing gear teeth of the first column and the outwardly-facing gear teeth of the second column when the powered lock is in the first position to rotatably lock the first column to the second column.

The angular position sensor may be operably connected to the output shaft of the motor whereby the angular position sensor generates a signal to the control system corresponding to an angular position of the output shaft.

The lock member may be configured to simultaneously engage the outwardly-facing gear teeth of the second column and a lock surface of the static member when the powered lock is in the second position to prevent rotation of the second column relative to the static member.

The powered lock may comprise a linear solenoid that shifts the lock member between the first and second positions when the powered lock is actuated.

The first column may comprise a lower column.

The second column may comprise an inner column.

The third column may comprise an upper column.

The manual steering input member may comprise a steering wheel.

The inner column may be at least partially disposed inside the lower column and the upper column.

The upper column may telescopically engage the inner column and the lower column.

The upper column may translate linearly along the axis of the steering column upon actuation of the motor.

Another aspect of the present disclosure is a steering column for autonomous motor vehicles including a static member and a rotatable lower (first) column. The steering column further includes a motor that is configured to rotate the lower column. The steering column further includes a rotatable inner (second) column and a rotatable upper (third) column that is operably interconnected to the lower column and the inner column, and axially movable along an axis of the steering column relative to the lower column and the inner column. The upper column and the inner column rotate together. The upper column and the inner column are operably interconnected such that motor-driven rotation of the lower column relative to the upper column causes inward and outward movement of the upper column relative to the lower column between retracted and use positions. The upper column may include a steering wheel. The steering column further includes a lock that is configured to lock the inner column to the lower column when the lock is in a first position. The lock is configured to lock the inner column to the static member when the lock is in a second position. The steering column defines: 1) an autonomous configuration in which the upper column and the steering wheel are in the stowed position, the lock is in the first position, and the motor is deactivated to prevent or inhibit rotation of the lower column, and: 2) a manual steering configuration in which the upper column and the steering wheel are in the use position, and the lock is in the second position to prevent rotation of the inner column relative to the static member.

Embodiments of the third aspect of the disclosure can include any one or a combination of the following features:

The steering column may optionally include an angular position sensor that is configured to generate a steering command signal corresponding to an angular position of the lower column.

The sensor may be configured to generate a steering command signal corresponding to an angular position of the lower column, the upper column, and the steering wheel.

The lock may comprise a powered actuator and a movable lock member that simultaneously engages the lower column and the inner column when the powered lock is in the first position to rotatably lock the lower column to the inner column.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3;

FIG. 4 is a partially schematic view of a portion of the steering column of FIG. 3 taken along the line IV-IV; FIG. 3;

FIG. 5 is a partially schematic view of a portion of the steering column of FIG. 3;

FIG. 6 is a partially schematic view of a portion of the steering column of FIG. 3;

DETAILED DESCRIPTION OF THE PREFERRED EMBODIMENTS

Figure 1:
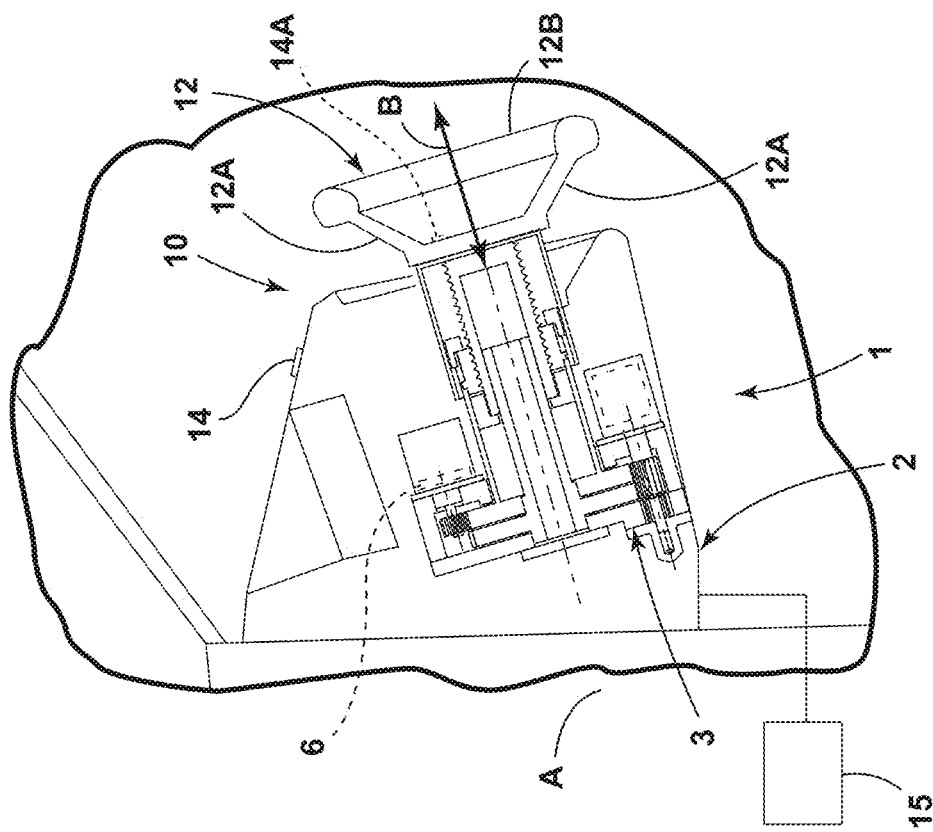
FIG. 1 is a partially fragmentary schematic view of a steering column in a stowed/retracted/autonomous configuration or mode.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical charac-teristics relating to the embodiments disclosed herein are not to be considered as limiting, unless the claims expressly state otherwise.

Figure 2:
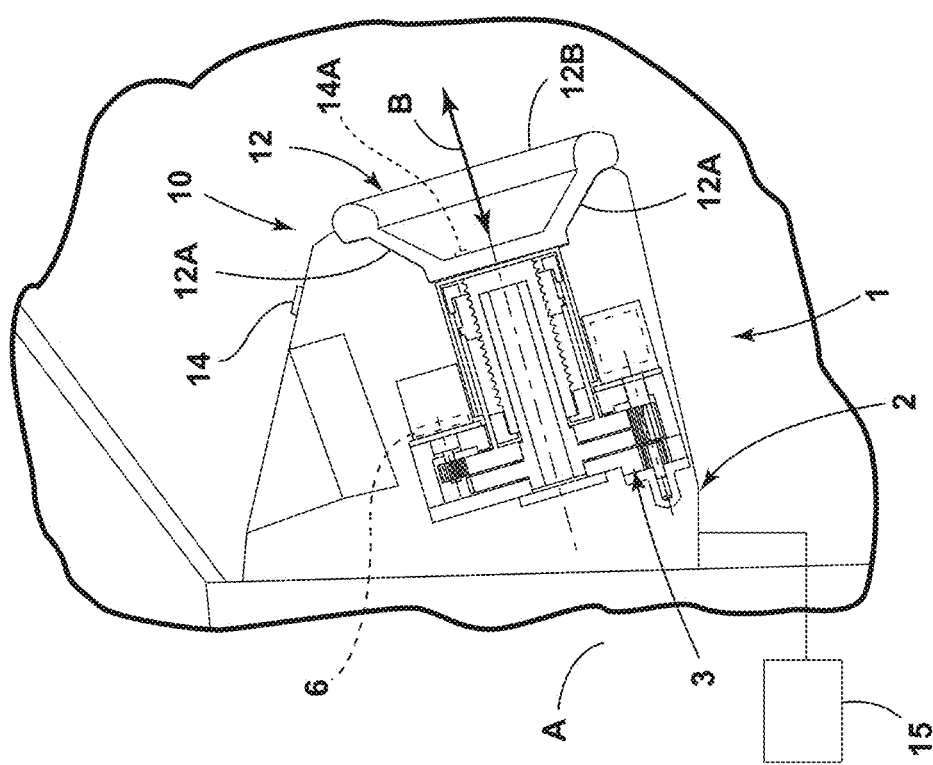
FIG. 2 is a partially fragmentary schematic view of a steering column in an extended manual use configuration or mode.

With reference to FIGS. 1 and 2, an autonomous vehicle 1 according to one aspect of the present disclosure includes a steering column 10 that is mounted to a vehicle structure 2. The steering column 10 can be shifted between the autonomous or stowed configuration of FIG. 1 and the manual or extended steering configuration of FIG. 2. The steering column 10 may be shifted to the stowed configuration of FIG. 1 when the autonomous vehicle 1 is in an autonomous mode in which the user does not manually rotate steering wheel 12 to provide steering input. However, when autonomous vehicle 1 is in the extended manual (use) steering configuration of FIG. 2, a user can grasp the steering wheel 12 to rotate the steering wheel 12 and provide steering inputs to the autonomous vehicle 1.

Figure 3:
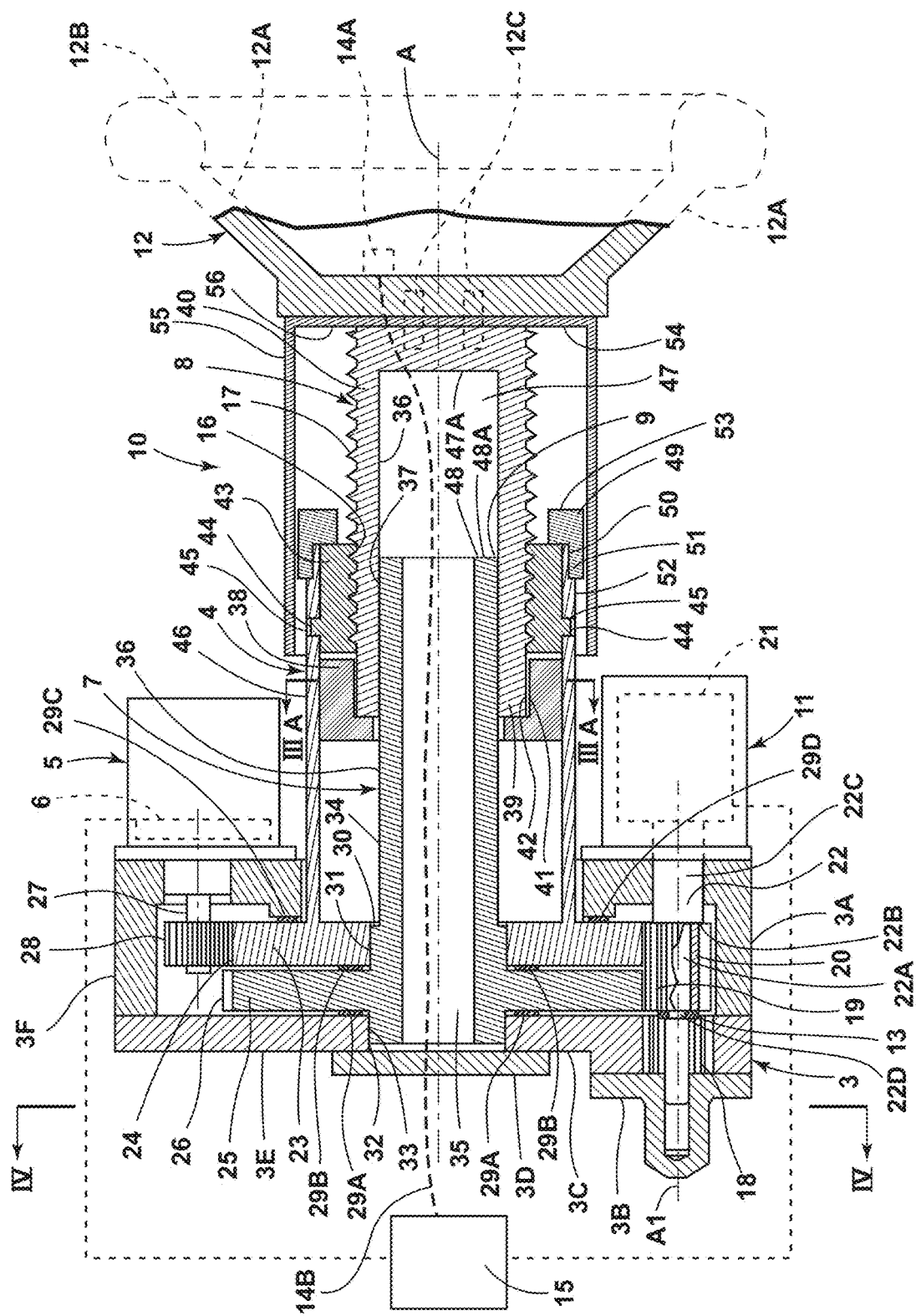
FIG. 3 is a partially schematic cross-sectional view of the steering column of FIGS. 1 and 2 in an extended manual use configuration.

With further reference to FIG. 3, the steering column 10 includes a static member 3 that may be fixed to a vehicle structure 2, and a rotatable lower (first) column 4. A powered actuator such as motor 5 is configured to operably engage the lower column 4 such that actuation of the motor 5 causes the lower column 4 to rotate about an axis "A" of the steering column 10. As discussed in more detail below, the motor 5 has a locked state in which the motor 5 prevents or inhibits rotation of the lower column 4. The steering column 10 further includes an angular position sensor 6 which may optionally comprise a rotary encoder of motor 5. The angular position sensor 6 is configured to generate a steering command signal to a controller 15 of autonomous vehicle 1 corresponding to an angular position of the lower column 4. A user input 14 (or 14A) may be operably connected to controller 15 to provide user commands to controller 15. The steering column 10 further includes a rotatable inner (second) column 7, and a rotatable upper (third) column 8. Steering wheel 12 may be fixed to the upper column 8. The upper column 8 telescopically (movably) engages lower column 4 and the inner column 7 whereby the upper column 8 is axially movable along axis A of steering column 10 relative to the lower column 4 and relative to the inner column 7 between a retracted (autonomous) position (FIG. 1) and an extended manual use position (FIG. 2). The upper column 8 is rotatably fixed relative to the inner column 7 by a spline type connection 9 (see also FIG. 3A) whereby the upper column 8 and the inner column 7 rotate together about the axis A of the steering column 10. The upper column 8 and the lower column 4 may be threadably interconnected by threads 16 and 17 such that actuation of motor 5 causes rotation of the lower column 4 relative to the upper column 8 and causes linear movement (e.g., arrow B; FIGS. 1 and 2) of the upper column 8 relative to the lower column 4 between the retracted position (FIG. 1) and the use position (FIG. 2).

The steering column 10 further includes a powered lock 11 that is configured to operably lock the inner column 7 to the lower column 4 when the powered lock 11 is in a first position (FIG. 3). The powered lock 11 is further configured to lock the inner column 7 to the static member 3 when the powered lock 11 is in a second position (FIG. 8). The steering column 10 defines an autonomous configuration (FIGS. 1 and 7) in which the upper column 8 and steering wheel 12 are in the stowed position, the powered lock 11 is in the first position, and the motor 5 is in a locked or deactivated state to prevent or inhibit rotation of the lower column 4. The steering column 10 further defines a manual steering configuration (FIGS. 2 and 9) in which the upper column 8 is in the use position, the powered lock 11 is in the second position to prevent rotation of the inner column 7 relative to the static member 3, and wherein the sensor 6 generates a steering command signal to the controller 15 corresponding to an angular position of the lower column 4, the upper column 8, and the steering wheel 12.

Referring again to FIG. 3, the static member 3 may comprise components or parts 3A-3F that may be rigidly interconnected by threaded fasteners (not shown) or other suitable connecting arrangement. The static member 3 may be rigidly fixed to vehicle structure 2. The static member 3 includes a locking surface 18 that may comprise gear teeth that are engaged by gear teeth 19 of a lock member 20. Powered lock 11 may include a solenoid 21 that is operably connected to controller 15. Solenoid 21 may be configured to linearly move a shaft 22 to thereby axially shift the locking member 20 in opposite directions along axis "A1" of powered lock 11 between the first position (FIGS. 3, 7, and 9), and a second position (FIG. 8). Lower column 4 includes a disk-shaped portion 23 having outwardly-facing gears 24, and inner column 7 includes a disk-shaped portion 25 having outwardly-facing gears 26. Low-friction bearings 29A are disposed between disk-shaped portion 25 and stationary portion 3A, and low-friction bearings 29B are disposed between disk-shaped portions 23 and 25. Low-friction bearings 29C are disposed between disk-shaped portion 23 and stationary portion 3F.

When the locking member 20 of powered lock 11 is in the first position, the gears 19 of locking member 20 simultaneously engage the gears 24 of lower column 4 and the gears 26 of inner column 7 to thereby rotationally lock the lower column 4 to the inner column 7. The powered lock 11 is operably connected to controller 15 to shift the powered lock 11 from the first position to the second position, and from the second position to the first position. Shaft 22 may be generally cylindrical with a smaller diameter first portion 22A, a larger diameter second portion 22C, and a transverse step or shoulder 22B extending between the first portion 22A and second portion 22B. Locking member 20 may include an annular groove 22D that receives a C-clip 13 to retain locking member on first portion 22A between shoulder 22B and C-clip 13. Locking member 20 may be in the form of a gear that is rotatably disposed on first portion 22A of shaft 22. Locking member 20 may, however, have virtually any suitable configuration and may be integrally formed with shaft 22.

Motor 5 may comprise an electric computer-controlled stepper or servo motor having a rotating member such as shaft 27 and a gear 28 that is mounted on the shaft 27. Motor 5 may be actuated to provide powered rotation of shaft 27, or deactivated to permit rotation of shaft 27. Motor 5 may also be locked to prevent or inhibit rotation of shaft 27. The gear 28 engages gears 24 of lower column 4 such that rotation of shaft 27 causes rotation of lower column 4, and rotation of lower column 4 causes rotation of shaft 27. The motor 5 is operably connected to controller 15, and controller 15 can actuate motor 5 to thereby rotate shaft 27 and lower column 4 in first and second opposite directions. As discussed in more detail below, rotation of lower column 4 causes axial shifting of upper column 8 and steering wheel 12 when the lock member 20 is in the second position (FIG. 8) to thereby shift (extend and retract) the steering column 10 between the autonomous and manual configuration (FIGS. 1 and 2). When the steering column 10 is in the autonomous mode, the motor 5 can be deactivated or shifted to a locked configuration to prevent or inhibit rotation of output shaft 27 and lower column 4. When the steering column 10 is in the manual steering configuration (mode), rotation of steering wheel 12 causes rotation of lower column 4 and shaft 25 of motor 5, and the angular position sensor 6 provides a signal to controller 15 corresponding to the steering input commands (i.e., rotation of steering wheel 12) of the vehicle operator. When in the manual steering configuration/mode, controller 15 may selectively actuate motor 5 to provide force feedback to a user rotating steering wheel 12.

Referring again to FIG. 3, the lower column 4 may include an opening 30 through disk-shaped portion 23 that slidably engages a cylindrical surface 31 of inner column 7 to thereby rotatably interconnect the lower column 4 and inner column 7. The opening 30 and cylindrical surface 31 may comprise low-friction bearings (e.g., low-friction materials, roller bearings, or other suitable bearing arrangement). The static member 3 may include an opening 32 having a cylindrical surface 31 that engages a cylindrical outer surface 33 of inner column 7 to thereby rotatably support the inner column 7 relative to the static member 3. The surface of opening 32 and surface 33 may comprise low-friction bearing material or roller bearings (not shown) as required for a particular application.

Figure 3A:
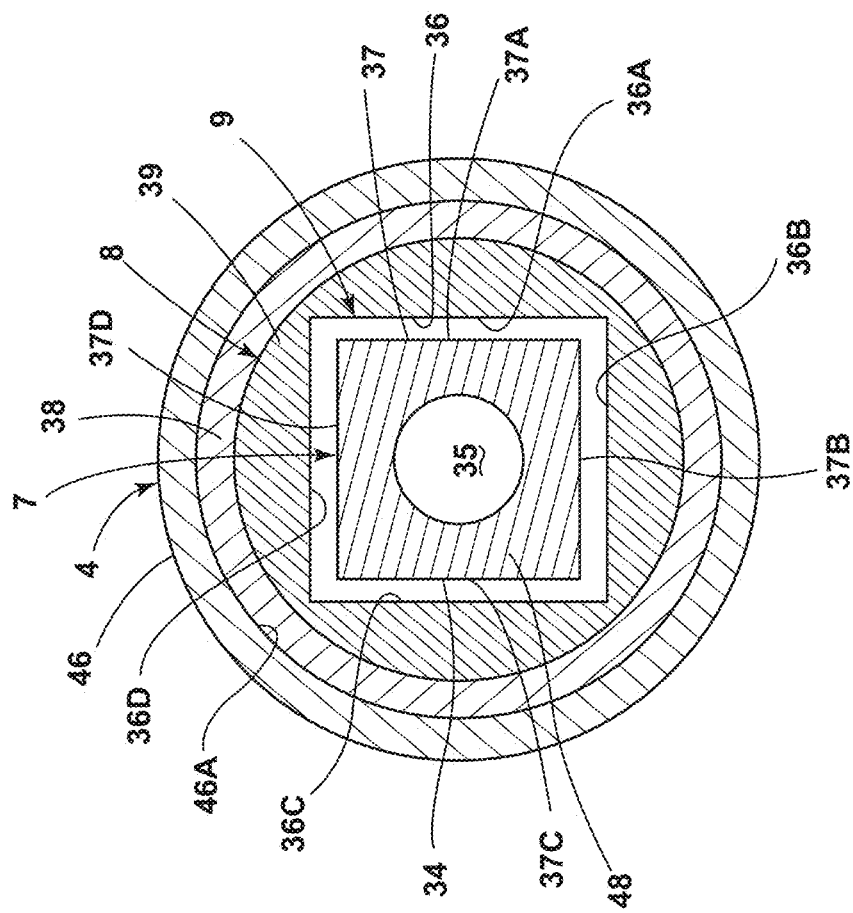
FIG. 3A is a partially schematic cross-sectional view of the steering column of FIG. 3 taken along the line IIIA-IIIA.

The inner column 7 further includes a shaft portion 34 having an inner cavity or passageway 35. The outer surface 37 of shaft 34 may have one or more flat surface portions 37A-37D (FIG. 3A) that slidably engage corresponding flat surface portions 36A-36D of inner surface 37 of upper column 8 to form a spline type connector 9. Spline connector 9 between inner column 7 and upper column 8 permits linear movement of upper column 8 relative to inner column 7, but rotationally fixes upper column 8 to inner column 7 such that upper column 8 and inner column 7 rotate together. It will be understood that FIG. 3A is schematic in nature and the gaps between surface portions 36A-36D and 37A-37D, respectively, are exaggerated to more clearly show the Y surfaces. The between surface portions 36A-36D and 37A-37D, respectively, may be very small or non-existent such that surface portions 36A-36D simultaneously engage surface portions 37A-37D, respectively. Furthermore, the spline surfaces 36 and 37 may comprise virtually any shape/configuration (e.g., teeth) providing linear motion of upper column 8 relative to inner column 7 while substantially preventing (or controlling) rotation of upper column 8 relative to inner column 7. A sleeve bearing 38 may include internal threads 41 (FIG. 3) that engage external threads 42 on end 39 of inner portion 40 of upper column 8 to thereby secure the sleeve bearing 38 to the upper column 8. Sleeve bearing 38 slidably engages cylindrical inner surface 46A of tubular sidewall 46 of lower column 4.

As discussed above, the spline type interconnection 9 between inner column 7 and upper column 8 permits the upper column 8 to translate along axis A relative to inner column 7. However, due to the configuration of the spline member 38 and outer surface 36 of inner column 7, the inner column 7 and upper column 8 are rotatably interconnected and rotate at the same angular rate.

Internal threads 16 of lower column 4 (FIG. 3) may be formed by a threaded fitting 43 including protrusions such as pins 44 that engage openings 45 in tubular wall 46 of lower column 4 to thereby secure the threaded fitting 43 to the lower column 4. Internal threads 16 threadably engage external threads 17 of inner portion 40 of upper column 8. Inner portion 40 includes a cavity 47 that slidably receives end 48 of shaft 34 of inner column 7 via spline connection 9 described above. A fitting 49 includes internal threads 50 engaging external threads 51 of end portion 52 of tubular sidewall of lower column 4 to thereby secure the fitting 49 to lower column 4. Fitting 49 includes a first surface 53 that may optionally contact inner surface 54 of upper column 8 when upper column 8 is in the stowed (retracted) or autonomous configuration. However, in a preferred embodiment, controller 15 stops motor 5 as steering column 10 is retracted before first surface 53 contacts inner surface 54. The upper column 8 may include a tubular outer cover portion 55 having an end wall 56 forming second surface 54. Steering wheel 12 may be secured to upper column 8 utilizing one or more connectors 12C. Connectors 12C may comprise virtually any suitable fasteners (e.g., screws, pins, etc.) as required for a particular application. Steering wheel 12 may include spokes 12A and a circular rim 12B, or other suitable configuration. However, as used herein, "steering wheel" is not limited to a specific configuration, but rather includes any structure configured to be manually grasped by a user to permit manual user steering input (commands). Steering wheel 12 is fixed to upper column 8 and rotates and translates with upper column 8. A push button or other user input 14A may be positioned on steering wheel 12. Optional electrical lines 14B may extend from user input 14A through cavity 47 of upper column 8 and through passageway 35 of inner column 7 to controller 15. User input 14A may comprise an input to extend or retract steering column 10. However, user input 14A may also comprise various inputs to control vehicle speed, vehicle audio and/or video systems, mobile phones, etc.

With reference to FIGS. 4-6, the motor 5 and powered lock 11 may be positioned at various locations relative to the axis A of the steering column 10. Thus, steering column 10 is not limited to the configuration of FIG. 4, but rather may take on virtually any suitable configuration.

Figure 7:
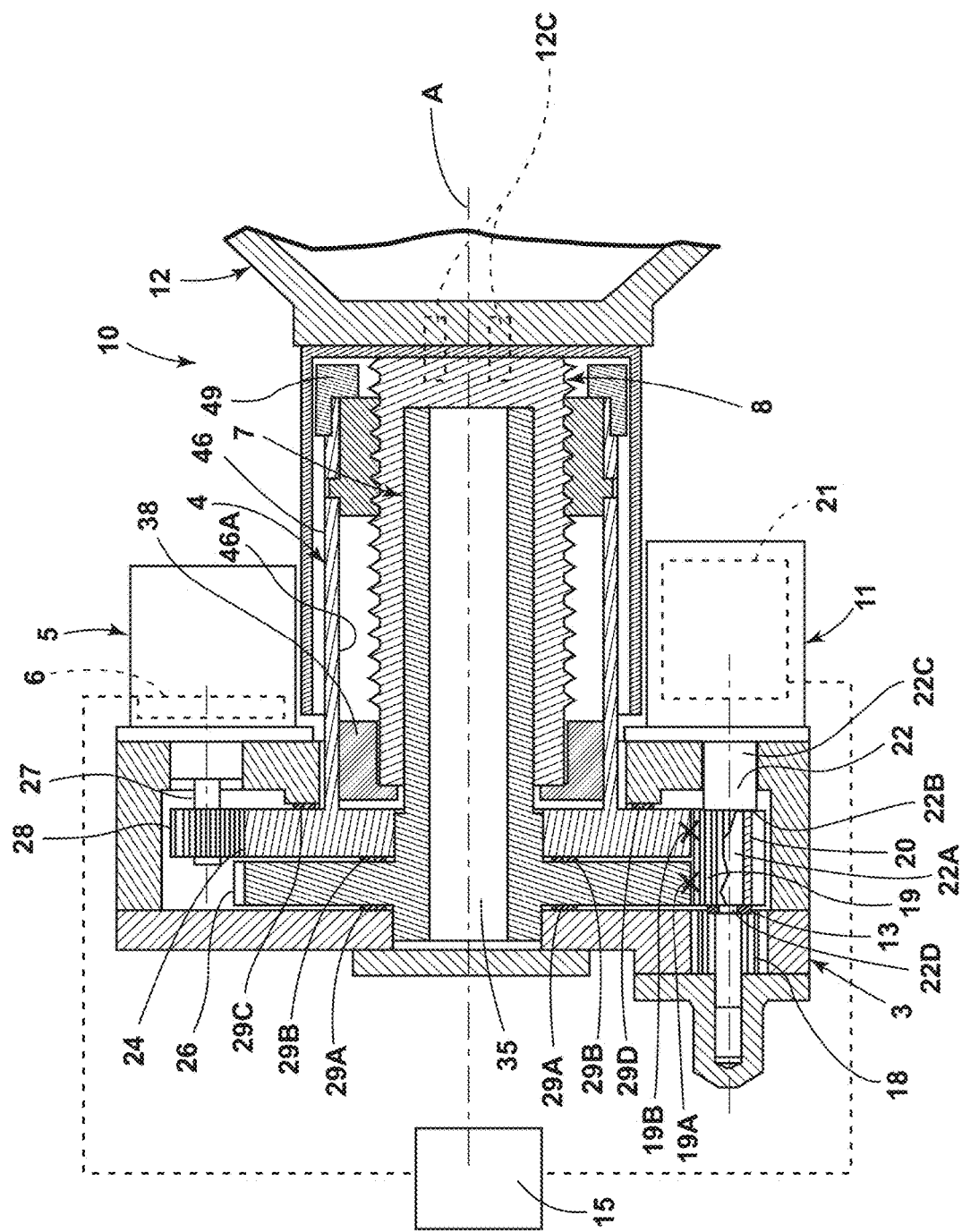
FIG. 7 is a partially schematic cross-sectional view of the steering column of FIGS. 1 and 2 showing the steering column in an autonomous (retracted) configuration or mode.
Figure 8:
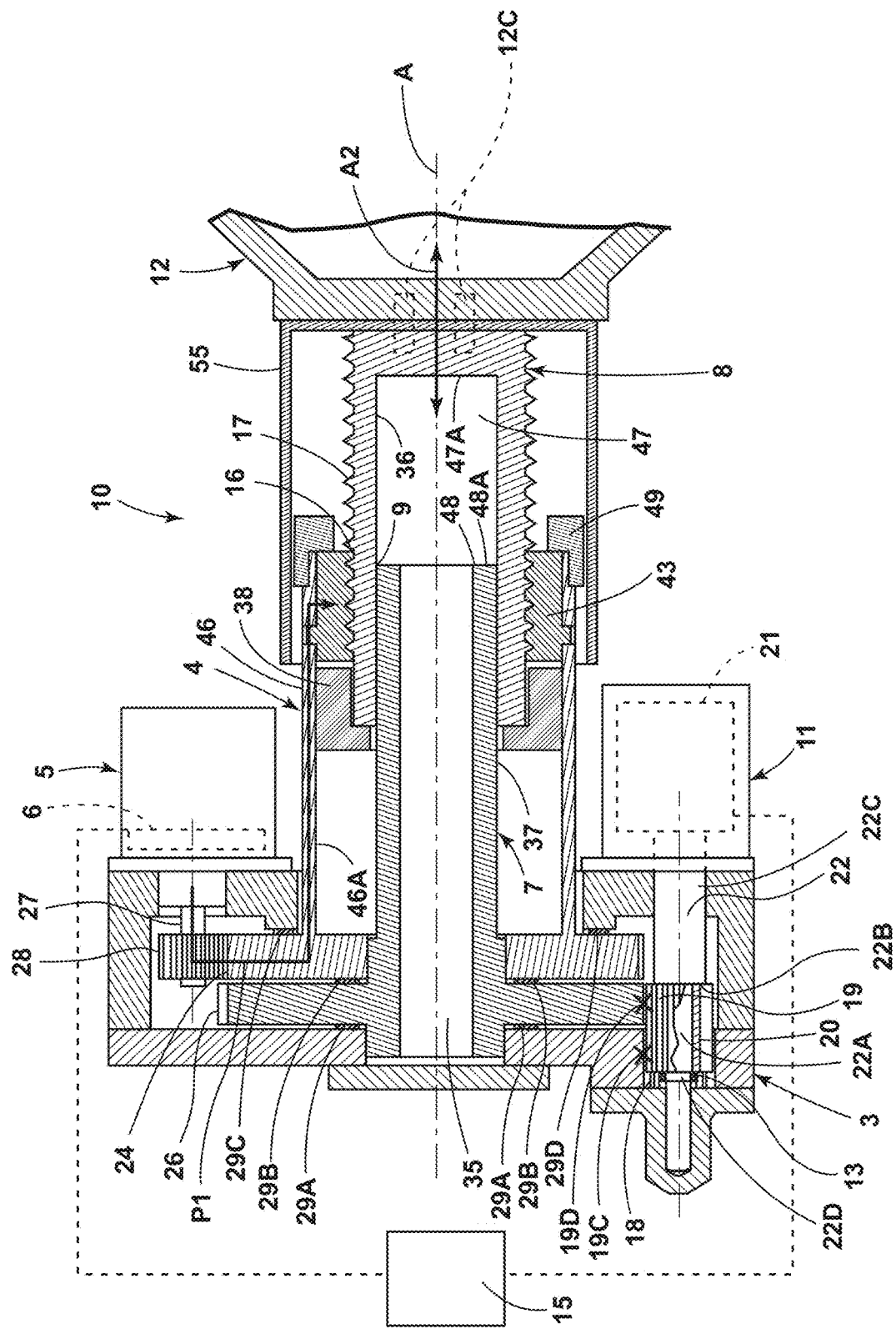
FIG. 8 is a partially schematic cross-sectional view of the steering column of FIGS. 1 and 2 showing extension and retraction of the steering column.

With reference to FIG. 7, when the steering column 10 is in the autonomous or stowed configuration, the upper column 8 and steering wheel 12 are in a retracted or stowed configuration, and the gears 19 of lock member 20 simultaneously engage gears 24 and 26 of lower column 4 and inner column 7, respectively, at 19A and 19B such that lower column 4 and inner column 7 are rotatably locked relative to one another. End surface 48A of inner column 7 may optionally contact surface 47A of upper column 8 to provide a "hard" mechanical stop when stowed. Alternatively, other surfaces may form a mechanical stop. Still further, controller 15 may determine the position of shaft 27 via sensor 6, and controller 15 may cause motor 5 to stop rotating shaft 27 before reaching a mechanical stop such that a gap is formed between surfaces 47A and 48A when steering column 10 is in the stowed configuration (i.e., controller 15 may store position data concerning the retracted position and/or extended position and utilize this data to stop motor 5 at retracted and/or extended positions). Also, controller 15 causes motor 5 to "lock" to prevent or inhibit rotation of output shaft 27 and gear 28 to thereby prevent rotation of lower column 4, inner column 7, upper column 8, and steering wheel 12. The controller 15 generates autonomous steering commands to the vehicle steering system when the steering column 10 is in the autonomous configuration of FIG. 7, and user input (e.g., rotation of steering wheel 12) is not required when the autonomous vehicle 1 is in the autonomous mode. In general, controller 15 may be configured to stop motor when steering column 10 reaches the stowed position of FIG. 7 such that a "hard" mechanical stop is not required. However, steering column 10 may be configured to include a mechanical stop if required.

With further reference to FIG. 8, the upper column 8 can be shifted outwardly from the autonomous or stowed configuration of FIG. 7 to an extended or manual use configuration of FIG. 8. Specifically, a user may actuate user input 14 or 14A (FIGS. 1 and 2) to provide a command signal to controller 15, and controller 15 actuates powered lock 11 to shift the lock member 20 to the second position of FIG. 8 such that the gear teeth 19 of lock member 20 simultaneously engage gears 26 of inner column 7 and locking surface or gears 18 of static member 3 to thereby rotatably fix inner column 7 relative to static member 3. Motor 5 can then be actuated (e.g., by controller 15) to rotate output shaft 27 and gear 28 to rotate lower column 4. As discussed above, inner column 7 and upper column 8 are interconnected by spline connection 9 such that upper column 8 cannot rotate when inner column 7 is locked to static member 3 by lock member 20. Thus, the relative rotation of threads 16 and 17 upon actuation of motor 5 causes the upper column 8 and steering wheel 12 to shift linearly along the axis A of steering column 10 as shown by the arrow "A2." The motor 5 can be actuated (e.g., by controller 15) to rotate the shaft 27 in first and second directions to extend and retract the upper column 8 and steering wheel 12 as required based on inputs from user input 14 and/or other commands. For example, the position of steering wheel 12 in the manual mode, upper column 8 can be adjusted (set) to provide for user comfort. Because extension and retraction of steering wheel 12 occurs when inner column 7 is locked to static member 3 (i.e., inner column 7 cannot be rotated to provide sensor input via sensor 6), the position of steering wheel 12 must be changed in the autonomous mode. For example, if steering column 10 is in the manual mode and a user wishes to extend or retract steering wheel 12, a user can input a request using input 14 (or 14A) and controller 15 may temporarily shift to an autonomous vehicle control mode while steering wheel 12 is moved, then switch back to manual control mode. Also, controller 15 may store one or more manual mode configurations (positions of steering wheel 12) and a user may select one of the stored configurations such that the steering wheel 12 stops at a user-selected position when switching from autonomous mode to manual mode. Thus, it will be understood that the steering wheel 12 may be positioned at various locations when steering column 10 is in the manual configuration.

Figure 9:
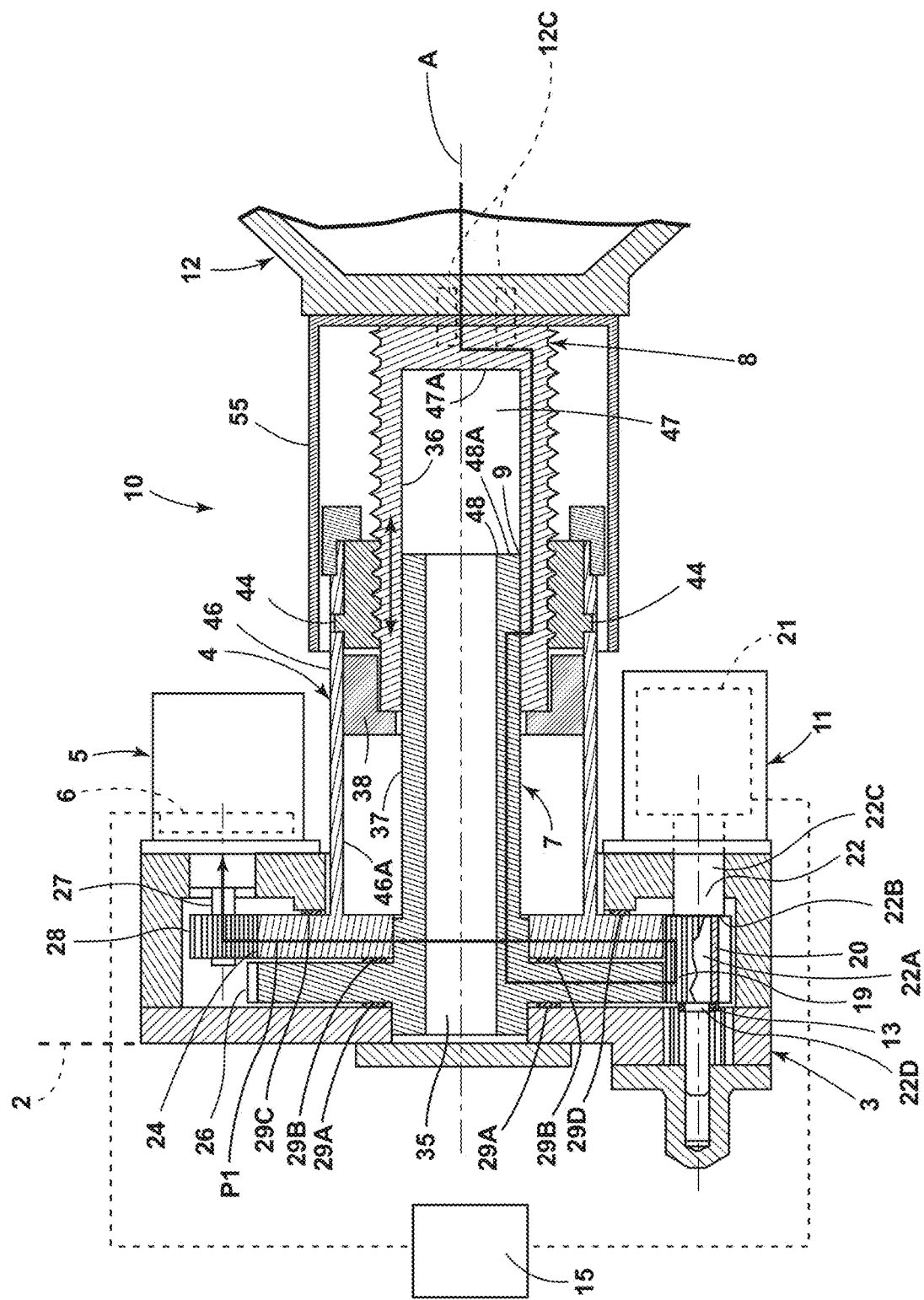
FIG. 9 is a partially schematic cross-sectional view of the steering column of FIGS. 1 and 2 showing the steering column in a manual (extended) steering configuration or mode.

With further reference to FIG. 9, when the steering column 10 is in a manual (extended) mode or configuration, the inner column 7 and upper column 8 are rotatably locked to lower column 4 by lock member 20, such that rotation of steering wheel 12 rotates lower column 4, inner column 7, and upper column 8, which in turn rotates shaft 27 of motor 5. Angular position sensor 6 of motor 5 detects an angular position of shaft 27 of motor 5 and provides an angular position signal to the controller 15 that corresponds to the user's manual steering input (i.e., angular position of steering wheel 12). Steering column 10 can be shifted from the manual configuration of FIG. 9 to the autonomous (stowed) configuration of FIG. 7 by reversing the process described above in connection with FIG. 8 (e.g., a user can input a command/request via input 14 or 14A). As discussed above, the actual position of upper column 8 and steering wheel 12 in the manual mode may vary as required by different users, and steering wheel 12 could be positioned inwardly from the position of FIG. 9 when steering column 10 is in the manual mode/configuration.

Figure 10:
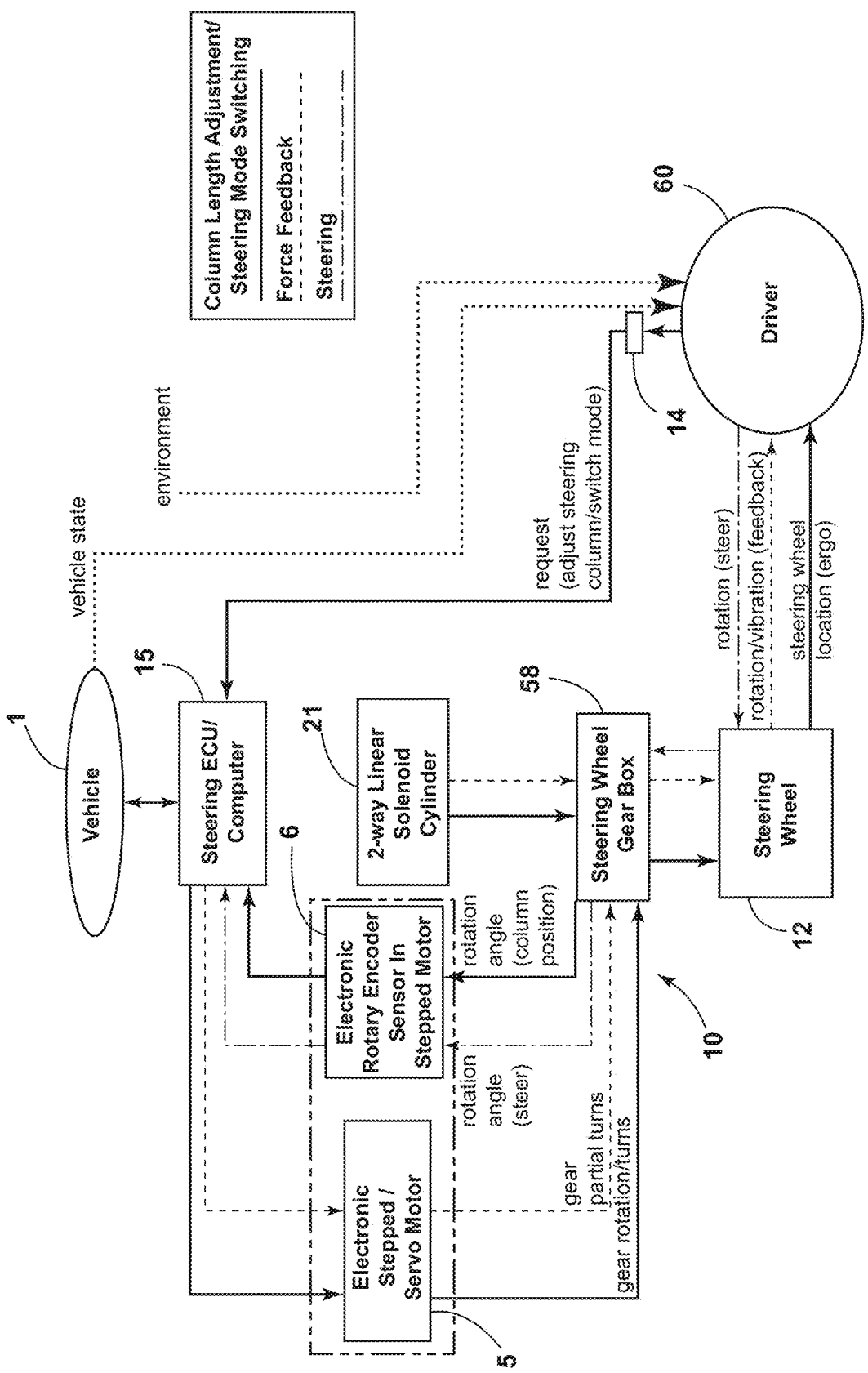
FIG. 10 is a block diagram of an autonomous vehicle including the steering column of FIGS. 1-9.

With further reference to FIG. 10, the steering column 10 includes an input 14 that enables a driver (user 60) to provide commands (inputs) to the computer 15 of autonomous vehicle 1. In FIG. 10, the steering wheel gearbox 58 generally designates a mechanical assembly comprising lower column 4, inner column 7, and upper column 8. The user inputs may include requests to shift steering column 10 from the configuration of FIG. 1 to the configuration of FIG. 2 and visa-versa. Inputs 14 may also be utilized to adjust a position of the steering wheel 12 for user comfort when in the manual mode (FIG. 2) (see "steering wheel location (ergo)" and "column length adjustment"). The motor 5 may be actuated to provide rotation/vibration feedback to driver 60 through steering wheel gearbox 58 when the system is in the manual configuration. When the system is in the autonomous mode, the computer 15 controls the servomotor 5 to thereby provide input into the steering wheel gearbox 58, which in turn provides angular position data to computer 15 via sensor (encoder) 6 to provide closed loop control. It will be understood that the autonomous vehicle 1 and steering column 10 may be configured as required for a particular application, and FIG. 10 is merely an example of one possible configuration.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A steering column for autonomous motor vehicles comprising:
    a static member;
    a rotatable lower column;
    a motor operably engaging the lower column whereby actuation of the motor causes the lower column to rotate, and wherein the motor has a locked state in which the motor inhibits rotation of the lower column;
    an angular position sensor configured to generate a steering command signal corresponding to an angular position of the lower column;
    a rotatable inner column;
    a rotatable upper column telescopically engaging the lower column and the inner column whereby the upper column is axially movable along an axis of the steering column relative to the lower column and relative to the inner column between a retracted position and a use position, the upper column being rotatably fixed relative to the inner column whereby the upper column and the inner column rotate together about the axis of the steering column, and wherein the upper column and the lower column are threadably interconnected such that actuation of the motor causes rotation of the lower column relative to the upper column and causes linear movement of the upper column relative to the lower column between the retracted and use positions;

a steering wheel fixed to the upper column;

a powered lock configured to lock the inner column to the lower column when the powered lock is in a first position, and wherein the powered lock is configured to lock the inner column to the static member when the powered lock is in a second position;

wherein the steering column defines: 1) an autonomous configuration in which the upper column and the steering wheel are in the stowed position, the powered lock is in the first position, and the motor is in a locked state to prevent rotation of the lower column; and 2) a manual steering configuration in which the upper column is in the use position, the powered lock is in the second position to prevent rotation of the inner column relative to the static member, and wherein the sensor generates a steering command signal corresponding to an angular position of the lower column, the upper column, and the steering wheel.

2. The steering column of claim 1, wherein:
the inner column is rotatably connected to the static member.

3. The steering column of claim 1, wherein:
the inner column includes a shaft extending through an opening in the lower column.

4. The steering column of claim 3, wherein:
the lower column includes outwardly-facing gear teeth;
the motor includes a rotating output shaft having a drive gear mounted to the output shaft, the drive gear engaging the outwardly-facing gear teeth of the lower column whereby the output shaft rotates when the motor is actuated to rotate the lower column.

5. The steering column of claim 4, wherein:
the angular position sensor is operably connected to the output shaft of the motor whereby the angular position sensor generates a signal corresponding to an angular position of the output shaft.

6. The steering column of claim 4, wherein:
the inner column includes outwardly-facing gear teeth;
the powered lock includes a lock member that simultaneously engages the outwardly-facing gear teeth of the lower column and the outwardly-facing gear teeth of the inner column when the powered lock is in the first position to rotatably lock the lower column to the inner column.

7. The steering column of claim 6, wherein:
the lock member simultaneously engages the outwardly-facing gear teeth of the inner column and a lock surface of the static member when the powered lock is in the second position to prevent rotation of the inner column relative to the static member.

8. The steering column of claim 7, wherein:
the powered lock comprises a linear solenoid that shifts the lock member between the first and second positions when the powered lock is actuated.

9. The steering column of claim 3, wherein:
the shaft of the inner column includes a first splined portion that axially and slidably engages a corresponding second splined portion of the upper column whereby the inner column and the upper column are rotatably fixed relative to one another, and the inner column and the second column telescope axially relative to one another.

10. An autonomous vehicle comprising:
a control system configured to generate steering commands when the autonomous vehicle is in an autonomous operation mode, and wherein the control system is configured to utilize steering commands from a vehicle operator when the autonomous vehicle is in a manual operation mode;

a steering column comprising:
a static member;
a rotatable first column;
a motor operably connected to the control system, the motor mechanically engaging the first column whereby actuation of the motor causes the first column to rotate;
an angular position sensor configured to generate a steering command signal to the control system corresponding to an angular position of the first column when the autonomous vehicle is in the manual operation mode;
a rotatable second column;
a rotatable third column movably coupled to the first column and the second column whereby the third column is movable along an axis of the steering column relative to the first column and the second column between retracted and use positions, the third column being rotatably fixed relative to the second column whereby the third column and the second column rotate together, and wherein the third column and the first column are operably interconnected such that actuation of the motor causes rotation of the first column relative to the third column and causes axial movement of the third column relative to the first column between the retracted and use positions, the third column including a manual steering input member;
a powered lock configured to lock the second column to the first column when the powered lock is in a first position, and to lock the second column to the static member when the powered lock is in a second position;

wherein the steering column defines: 1) an autonomous configuration in which the third column is in the stowed position, the powered lock is in the first position, and the motor prevents rotation of the first column; and 2) a manual steering configuration in which the third column is in the use position, the powered lock is in the second position to prevent rotation of the second column relative to the static member, and wherein the sensor generates a steering command signal corresponding to an angular position of the first column, the third column, and the manual steering input member;

and wherein the control system is configured to actuate the motor and the powered lock to shift the steering column between the autonomous configuration and the manual steering configuration.

11. The autonomous vehicle of claim 10, wherein:
the first and third columns are threadably interconnected.

12. The autonomous vehicle of claim 11, wherein:
the second column includes a shaft extending through an opening in the first column to rotatably interconnect the second column and the first column.

13. The autonomous vehicle of claim 12, wherein:
the first column includes outwardly-facing gear teeth;
the second column includes outwardly-facing gear teeth;
the motor includes a rotating output shaft having a drive gear mounted to the output shaft, the drive gear engaging the outwardly-facing gear teeth of the first column whereby the output shaft rotates when the motor is actuated to rotate the lower column;
the powered lock includes a lock member that simultaneously engages the outwardly-facing gear teeth of the first column and the outwardly-facing gear teeth of the second column when the powered lock is in the first position to rotatably lock the first column to the second column.

14. The autonomous vehicle of claim 13, wherein:
the angular position sensor is operably connected to the output shaft of the motor whereby the angular position sensor generates a signal to the control system corresponding to an angular position of the output shaft.

15. The autonomous vehicle of claim 14, wherein:
the lock member simultaneously engages the outwardly-facing gear teeth of the second column and a lock surface of the static member when the powered lock is in the second position to prevent rotation of the second column relative to the static member.

16. The autonomous vehicle of claim 15, wherein:
the powered lock comprises a linear solenoid that shifts the lock member between the first and second positions when the powered lock is actuated.

17. The autonomous vehicle of claim 10, wherein;
the first column comprises a lower column;
the second column comprises an inner column;
the third column comprises an upper column;
the manual steering input member comprises a steering wheel;
and wherein the inner column is at least partially disposed inside the lower column and the upper column, and the upper column telescopically engages the inner column and the lower column whereby the upper column translates linearly along the axis of the steering column upon actuation of the motor.

18. A steering column for autonomous motor vehicles comprising:
a static member;
a rotatable lower column;
a motor configured to rotate the lower column;
a rotatable inner column;
a rotatable upper column operably interconnected to the lower column and the inner column and axially movable along an axis of the steering column relative to the lower column and the inner column, the upper column and the inner column rotating together, and wherein the upper column and the inner column are operably interconnected such that motor-driven rotation of the lower column relative to the upper column causes inward and outward movement of the upper column relative to the lower column between the retracted and use positions, the upper column including a steering wheel;
a lock configured to lock the inner column to the lower column when the lock is in a first position, and wherein the lock is configured to lock the inner column to the static member when the lock is in a second position;
wherein the steering column defines: 1) an autonomous configuration in which the upper column and the steering wheel are in the stowed position, the lock is in the first position, and the motor is in a locked state to prevent rotation of the lower column; and 2) a manual steering configuration in which the upper column is in the use position, the powered lock is in the second position to prevent rotation of the inner column relative to the static member.

19. The steering column of claim 18, including:
an angular position sensor configured to generate a steering command signal corresponding to an angular position of the lower column;
and wherein the sensor generates a steering command signal corresponding to an angular position of the lower column, the upper column, and the steering wheel.

20. The steering column of claim 19, wherein:
the lock comprises a powered actuator and a movable lock member that simultaneously engages the lower column and the inner column when the powered lock is in the first position to rotatably lock the lower column to the inner column.

* * * * *